Nov. 26, 1957  S. RUBEN  2,814,664
ELECTRIC CURRENT PRODUCING CELL
Filed Feb. 4, 1957  2 Sheets-Sheet 1

INVENTOR
Samuel Ruben
BY
ATTORNEY

Nov. 26, 1957 S. RUBEN 2,814,664
ELECTRIC CURRENT PRODUCING CELL
Filed Feb. 4, 1957 2 Sheets-Sheet 2

INVENTOR.
SAMUEL RUBEN
BY
ATTORNEY

United States Patent Office 2,814,664
Patented Nov. 26, 1957

2,814,664
ELECTRIC CURRENT PRODUCING CELL

Samuel Ruben, New Rochelle, N. Y.

Application February 4, 1957, Serial No. 637,971

18 Claims. (Cl. 136—119)

This invention relates to electric current producing cells, and, more particularly, to a galvanic cell utilizing a compound of mercury as its depolarizer.

Objects of the invention are to provide a cell having a high ratio of current output capacity to cell volume, a relatively high ratio of current output above accepted cut-off voltage to total current output capacity, a substantially sustained voltage or flat voltage discharge curve with continuous output throughout a relatively long cell life, negligible leakage of end products after operating life and a relatively long shelf or open circuit life without undue internal deterioration. It is desired to provide such a cell utilizing a mercury compound depolarizer which does not require the special structures employed in the mercuric oxide alkaline cell and which may be easily and conveniently produced in a number of cell and battery structures.

Figure 1:
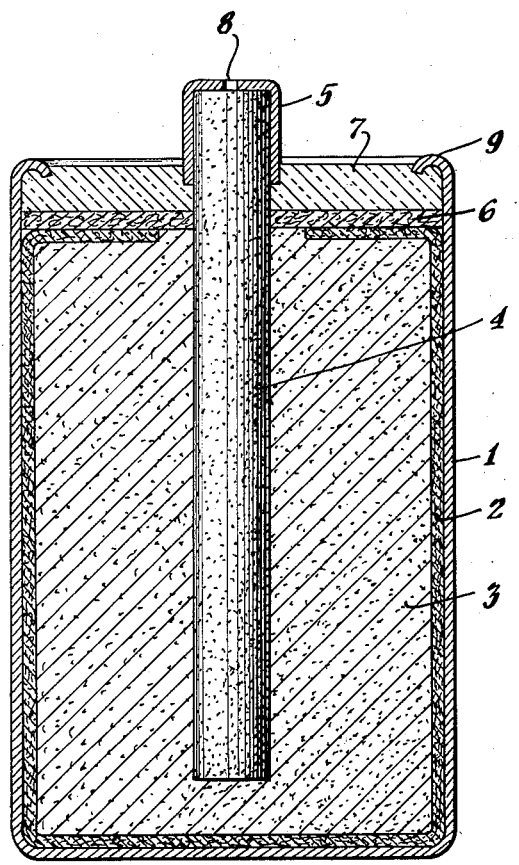
Figure 2:
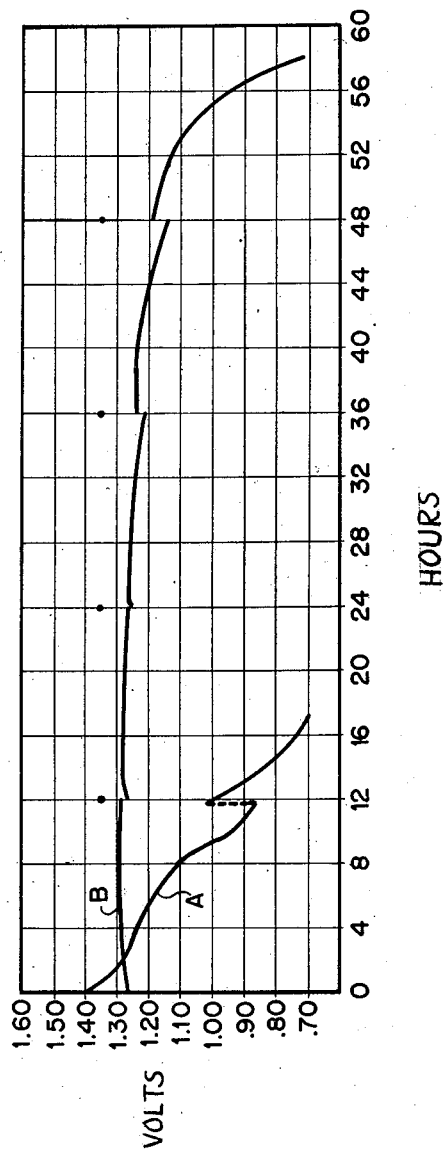

Other and further objects and advantages of the invention will become apparent from the following description and from the accompanying drawings, in which Fig. 1 is a longitudinal sectional view, having parts in elevation, of a cell structure embodying the invention, and Fig. 2 is a graph showing comparative operating performance of a conventional zinc carbon dry cell and a cell made according to this invention.

The compounds of mercury when used as depolarizer electrodes in primary cells provide high ampere hour capacity in a small volume, due to the high density of such compounds and due to the fact that such compounds are readily reduced to a metallic state without the formation of intermediate compounds which are inactive or have a lower potential, as is the case when manganese dioxide is used as a depolarizer in neutral electrolytes.

Mercuric oxide is successfully used as a depolarizer in commercial cells and batteries, the electrolyte being an alkaline solution having a negligible dissolving action on the mercuric oxide, as exemplified in my Patent No. 2,422,045. Cells of this general type usually require special structures to positively prevent leakage of the corrosive electrolyte.

The relatively inexpensive structures characteristic of standard zinc-carbon manganese dioxide cells are possible as a result of the use of sal ammoniac electrolyte. To use such structures with a reducible metal compound, specifically with a mercury compound, it is essential that the compound be stable in the electrolyte and be ionically reducible. Mercuric oxide, although stable in neutral electrolytes, produces a low voltage and quickly polarizes on load.

In the past mercurous sulfate (sulfate of mercury), in combination with a sulfate salt electrolyte has apparently been used as a depolarizer in admixture with carbon or in admixture with mercuric oxide and carbon, such cells being disclosed in U. S. Patent No. 941,416 (1909), to Heil. However, such cells, as far as applicant is aware, have never reached the commercial stage.

In my co-pending applications Serial Nos. 545,606 and 562,740, filed November 8, 1955, and February 1, 1956, respectively, I have disclosed primary cells comprising a cathode depolarizer of mercuric dioxysulfate (the basic sulfate of mercury, $3HgO \cdot SO_3$), having a minor proportion of finely divided carbon admixed therewith, in combination with a zinc anode and a sulfate salt electrolyte containing a small amount of a suitable inhibitor, such as a soluble chromate. This application is a continuation-in-part of my above mentioned co-pending applications.

I have found that mercuric dioxysulfate constitutes an excellent depolarizer when used in combination with a suitable anode and a compatible electrolyte. The electrolyte should be one which is relatively inert with respect to the depolarizer so that it will not substantially dissolve or react with the depolarizer or cause corrosion of the anode on shelf. A compatible electrolyte is one having an anion which on storage will not displace the anion of the depolarizer. The preferred electrolytes are aqueous solutions of salts selected from the sulfates of alkali metals and alkaline earth metals, such as zinc, magnesium, sodium, potassium or lithium sulfate. In general, the sulfates of the alkali metals, sodium, potassium and lithium, are not as satisfactory as the sulfates of the alkaline earth metals, such as zinc sulfate or magnesium sulfate.

The concentration of the sulfate electrolyte may be within 10 g. and 30 g. per 100 ml. water, the preferred concentration being between 20 g. and 25 g. per 100 ml. water.

For maximum shelf life, it is desirable to add a suitable inhibitor which prevents local action on the anode. The inhibitor may be a small percentage of a water-soluble chromate, with the exclusion of chromic acid, such as, for example, potassium dichromate. The concentration of the soluble chromate inhibitor added to the electrolyte may be between a fraction of a percent and a few percent, an addition of 1% potassium dichromate being satisfactory for the purpose.

In the preparation of the depolarizer, the mercuric dioxysulfate is preferably mixed with carbon to insure low internal resistance throughout the useful life of the cell, suitable compositions being in the approximate range of 4 to 12 parts of dioxysulfate by weight to one part of carbon black, a preferred mixture being 9 parts by weight, of mercuric dioxysulfate ($3HgO \cdot SO_3$) and one part by weight of Shawinigan carbon black.

Mercuric dioxysulfate appears to be very slightly soluble in sulfate salt electrolyte solutions, such as in a solution of zinc sulfate or magnesium sulfate. Although, during its production, the mercuric dioxysulfate is thoroughly washed to eliminate any residual sulfuric acid content, nevertheless, a very small amount of the acid may be retained which, I believe, is an important factor in causing the slight degree of solubility noted over a period of several months. I have found that the solubility of the mercuric dioxysulfate is interrelated with the pH of the solution and increases as the pH of the solution decreases. At first the solubility is negligible but as the cell is stored for long periods of time, particularly at elevated temperatures, the slight increase in acidity or lowering of the pH caused by such minute solubility, progressively increases the solubility. The progressively increasing solubility is, of course, undesirable as in time it will cause excessive amalgamation and embrittlement of the zinc anode, and the production of some zinc oxide in the boundary surface of anode and electrolyte-spacer layer. This will result in an increase of the internal resistance of the cell, reduces the flash current and, in general, interferes with the full and efficient utilization of the active cathode and anode materials of the cell. While the addition of a suitable inhibitor, such as a soluble chromate, is beneficial in that it reduces the extent to which the zinc anode is amalgamated and also reduces the open circuit reactivity of the zinc with the electrolyte, the inhibitor by itself is incapable of eliminating the difficulties resulting from the solubility of the mercuric dioxysulfate in the electrolyte.

I have been able to eliminate the above-mentioned difficulties by the provision of a buffer agent in the electrochemical cell system. The function of this buffer agent is to increase the pH of the electrolyte to a higher value and to stabilize the pH at such value throughout the useful life of the cell. I have found that by the introduction of a compatible buffer agent in suitable amounts, the pH of the electrolyte can be readily adjusted to the optimum value and will change but very little either during discharge of the cell or when the cell is stored for long inactive periods. Thus, the amount of mercuric dioxysulfate that can be dissolved in the electrolyte on the shelf is greatly reduced as well as the local reaction of the electrolyte with the anode, specifically a zinc anode.

The buffer agent may be introduced into the cell system in various ways. In the simplest case, it may be added to the depolarizer in the form of a solid salt which is relatively insoluble in the electrolyte and which combines with any residual or hydrolytically produced acid content. Insoluble carbonates of the alkaline earth metals, such as of calicum, strontium and barium, are very satisfactory for the purpose. In general between 0.5% and 2% by weight of the solid alkaline earth metal carbonate is added to and uniformly distributed in the depolarizer mixture. Calcium carbonate is the preferred material and excellent results are obtained by incorporating about 1% by weight of this carbonate into the depolarizer mix.

It is also possible to incorporate the buffer agent into the electrolyte, instead of adding it to the depolarizer. Buffer agents suitable for this purpose are aqueous solutions of certain organic acid salts such as those of the acetates, tartrates or citrates of the alkali or alkaline earth metals. For example, the organic acid salt solutions may have a concentration between 10 g. and 30 g. per 100 ml. water, and 10% to 35% by volume of this solution may be admixed with the sulfate electrolyte, such as zinc sulfate, which may have a concentration between 10 g. and 35 g. per 100 ml. of water. The preferred buffer solutions are the acetates of magnesium, potassium and sodium. Thus, excellent results are obtained with an electrolyte composed of 90 parts by volume of zinc sulfate having a concentration of 25 g. per 100 ml. water and 10 parts by volume of magnesium acetate $$Mg(C_2H_3O_2)_2 \cdot 4H_2O$$

having a concentration of 25 g. per 100 ml. water, a chromate inhibitor, such as 1% by weight of potassium dichromate being added to the electrolyte. I prefer to hold the pH range of the electrolyte between 4.5 and 6.5 although cells with electrolytes outside of this range have shown no loss of capacity after extended storage.

Reference may be had to the following table, showing the correlation between the quantity of buffer agent in the electrolyte and the pH of the electrolyte. All of the electrolytes referred to in the said table contain 1% by weight of potassium dichromate, $(K_2Cr_2O_7)$, and the concentration of the zinc sulfate solutions, as well as that of the potassium and magnesium acetate solutions, is 25 g. per 100 ml.

| Electrolyte (in parts by volume): | pH |
|---|---|
| $ZnSO_4$ | 4.1 |
| $50ZnSO_4 + 50KC_2H_3O_2$ | 6.2 |
| $75ZnSO_4 + 25KC_2H_3O_2$ | 6.0 |
| $90ZnSO_4 + 10KC_2H_3O_2$ | 5.65 |
| $50ZnSO_4 + 50Mg(C_2H_3O_2)_2 \cdot 4H_2O$ | 6.0 |
| $75ZnSO_4 + 25Mg(C_2H_3O_2)_2 \cdot 4H_2O$ | 5.8 |
| $90ZnSO_4 + 10Mg(C_2H_3O_2)_2 \cdot 4H_2O$ | 5.5 |

Without the addition of the potassium chromate inhibitor, the pH of a zinc sulfate solution having a concentration of 25 g./100 ml. is 5.8 and the pH of a magnesium sulfate solution having the same concentration is 4.15.

In comparative tests, a cathode depolarizer of mercuric dioxysulfate and carbon, in contact with an electrolyte of $ZnSO_4$ having a concentration of 25 g./100 ml. and containing 1% by weight of $K_2Cr_2O_7$, was maintained in an oven at a temperature of 130° F. for 36 days. The initial pH of the electrolyte was 4.1, which by the end of the 36 days was reduced to 2.2, indicating progressive solubility of the mercuric dioxysulfate in the electrolyte. When ½% by weight of the buffer agent $CaCO_3$ was added to the depolarizer, the pH of the electrolyte after the same period of storage at 130° F. remained substantially constant at 5.2. When, instead of adding a solid buffer agent to the depolarizer, 25 parts by volume of potassium acetate having a concentration of 25 g./100 ml. were added to 75 parts by volume of the zinc sulfate electrolyte, the pH remained substantially constant at 5.3 after the 36 days of storage at 130° F.

Referring now to Fig. 1 of the drawing, reference numeral 1 denotes the zinc can serving as the container and anode, which is preferably slightly amalgamated before use to assure maximum shelf life and uniform utilization of the anode surface. A porous paper liner 2, having a thickness of .004" is provided inside of the container, said liner being impregnated and coated with a suitable barrier material. This impregnation and coating of the liner is obtained by passing the liner through an aqueous solution containing 8% by weight of gelatin, 5% by weight of glycerine and 5% by weight of gum arabic and then baking the liner dry.

The depolarizer bobbin mix is prepared by milling 9 parts by weight of mercuric dioxysulfate with 1 part by weight of Shawinigan carbon black. These two materials are intimately mixed with each other and then 1% by weight of powdered calcium carbonate is admixed. To each 9 g. of this mix is added 4.2 cc. of electrolyte composed of 25 g. of zinc sulfate $(ZnSO_4 \cdot 7H_2O)$ per 100 ml. of water and containing 1% by weight of potassium dichromate.

After the liner 2 has been placed in container 1, the depolarizer bobbin 3 which in an AA-size cell is composed of 11 grams of the above-described mix is inserted, together with waxed or silicone impregnated carbon rod 4, the bobbin being compressed and expanded against the paper liner to afford good contact.

Wax impregnated cardboard disc 6 is forced into the container 1 to hold down the top end portion of paper liner 2, which folds over the top surface of the bobbin under compression. The open end of the container is then rolled over as indicated at 9 and a layer 7 of fused hard wax is poured on top of disc 6 to seal the cell. The wax enters under the rolled over end of the container and upon solidification provides a reliable seal. A brass cap 5, forced over the outer end of carbon rod 4, constitutes one of the terminals of the cell and is provided with a small hole 8 to permit the escape of air or gas from the interior of the cell.

When the buffer agent is added to the electrolyte instead of the depolarizer, the electrolyte may be composed of 90 parts by volume of the zinc sulfate solution (25 g. per 100 ml. water) and 10 parts by volume of magnesium acetate solution (25 g. per 100 ml. water), the electrolyte also containing 1% by weight of potassium dichromate.

Instead of employing a paper liner 2, I have found it very desirable in most cases to use a laminate comprising a .004" layer of Dexter paper and a .0009" layer of cellophane (regenerated cellulose film), each layer having been coated or impregnated with the gelatin-glycerine-gum arabic solution previously described, the paper layer facing the zinc.

The cell described above has an open circuit potential of approximately 1.45 volts.

Fig. 2 is a graph illustrating the discharge characteristics of a cell embodying the invention, as compared to those of a conventional cell of the same dimensions.

Both cells were of the so-called "pen-lite" type and were discharged intermittently into a load of 50 ohms, discharge periods of 12 hours alternating with rest periods of 12 hours. As will be noted from curve A, indicating the voltage of the conventional cell as a function of time, the voltage decreases quite steeply, dropping slightly below .9 volt, considered the practically useful minimum, by the end of the first discharge period of 12 hours. Although the cell will recover to some extent during the following rest period of 12 hours, upon being connected again to the load, its voltage will drop below .9 volt after 1 hour. In contrast to this, as shown in curve B, the voltage of the cell of the invention changes but very little during the first 3 discharge periods of 12 hours each, will drop only to about 1.15 volts by the end of the fourth discharge period, and will reach the minimum useful voltage of .9 volt after 8½ hours of the fifth discharge period. In the cell of this invention, there is no substantial increase in volume of the depolarizer bobbin, during or after complete discharge of the cell. There is, therefore, no tendency to leak end product materials, such as occurs with discharged conventional zinc carbon cells, with consequent damage to contiguous parts or equipment.

Although the present invention has been disclosed in connection with a few preferred embodiments thereof, variations and modifications may be resorted to by those skilled in the art without departing from the principles of the invention. If, instead of a zinc anode, a magnesium anode is used, it is desirable to use an electrolyte of magnesium sulfate and magnesium acetate containing a chromate inhibitor, a cell of this type having an initial open current potential of approximately 2.05 volts. While I have described an embodiment of the invention in the form of a cylindrical cell, it is obvious that different cell structures, such as flat and stack type, may be conveniently utilized.

I claim:

1. An electric current producing cell comprising an anode, a sulfate salt electrolyte, and a cathode depolarizer the major portion of which is composed of mercuric dioxysulfate.

2. An electric current producing cell comprising a zinc anode, an electrolyte composed of an aqueous solution of a sulfate salt selected from the group consisting of the sulfates of alkali metals and alkaline earth metals, and a cathode depolarizer the major portion of which is composed of mercuric dioxysulfate.

3. An electric current producing cell comprising a zinc anode, an electrolyte of zinc sulfate, and a cathode depolarizer the major portion of which is composed of mercuric dioxysulfate.

4. An electric current producing cell comprising a magnesium anode, an electrolyte of magnesium sulfate, and a cathode mix consisting essentially of a mercuric dioxysulfate depolarizer and finely divided electronically conductive material.

5. An electric current producing cell comprising a zinc anode, a cathode depolarizer essentially consisting of a major proportion of mercuric dioxysulfate and a minor proportion of carbon black, and a sulfate electrolyte, said electrolyte being substantially inert with respect to said depolarizer.

6. An electric current producing cell comprising a zinc anode, a cathode depolarizer of which the effective depolarizer constituent consists preponderantly of mercuric dioxysulfate, and a sulfate electrolyte containing a soluble chromate inhibitor.

7. A primary cell comprising a zinc anode, a cathode depolarizer of mercuric dioxysulfate intimately admixed with a minor proportion of carbon, an electrolyte composed of an aqueous solution of a metal salt selected from the sulfates of alkali metals and alkaline earth metals and containing a soluble chromate inhibitor, and a buffer agent of an alkaline earth metal carbonate insoluble in the electrolyte admixed with said cathode depolarizer.

8. A primary cell comprising a zinc anode, a cathode depolarizer consisting preponderantly of mercuric dioxysulfate intimately admixed with a minor proportion of carbon and also containing between 0.25% and 2% by weight of an alkaline earth metal carbonate, and an electrolyte composed of an aqueous solution of a metal salt selected from the sulfates of alkali and alkaline earth metals and of a soluble chromate inhibitor, the concentration of said metal salt being between 10 g. and 30 g. per 100 ml., said alkaline earth metal carbonate constituting a buffer agent effective to stabilize the pH of the electrolyte at a relatively high value.

9. A primary cell comprising a zinc anode, a cathode depolarizer composed of a mixture of 4 to 12 parts by weight of mercuric dioxysulfate and 1 part by weight of finely divided carbon and also containing between 0.25% and 2% by weight of a carbonate selected from the group consisting of calcium carbonate, strontium carbonate and barium carbonate intimately admixed therewith, and an aqueous electrolyte composed of an alkali earth metal sulfate and of a soluble chromate inhibitor, said carbonate in the cathode depolarizer constituting a buffer agent effective to stabilize the pH of the electrolyte at a relatively high value.

10. A primary cell comprising a zinc anode, a cathode depolarizer composed of a mixture of mercuric dioxysulfate with a minor amount of finely divided carbon and also containing a small percentage of calcium carbonate, and an electrolyte composed of an aqueous solution of zinc sulfate and a soluble chromate inhibitor, said calcium carbonate being present in the cathode depolarizer in an amount sufficient to stabilize the pH of the electrolyte at a relatively high value.

11. A primary cell comprising a zinc anode, a cathode depolarizer essentially composed of mercuric dioxysulfate and finely divided electronically conductive material, and an aqueous electrolyte comprising a major proportion of a metal salt selected from the sulfates of alkali and alkaline earth metals and a minor proportion of metal salt of an organic acid selected from the group consisting of the acetates, tartrates and citrates of alkali and alkaline earth metals.

12. A primary cell comprising a zinc anode, a cathode depolarizer essentially composed of mercuric dioxysulfate and finely divided electronically conductive material, an aqueous sulfate salt electrolyte, and a solution of a metal salt of an organic acid selected from the group consisting of the acetates, tartrates and citrates of alkali and alkaline earth metals admixed with said electrolyte in an amount sufficient to stabilize the pH of the electrolyte between approximately 4.5 and 6.5.

13. A primary cell comprising a zinc anode, a cathode depolarizer composed of a mixture of mercuric dioxysulfate with a minor amount of finely divided carbon, and an aqueous electrolyte comprising an alkaline earth metal sulfate solution and 5% to 25% by volume of a solution selected from the group consisting of alkali metal acetates and alkaline earth metal acetates.

14. A primary cell comprising a zinc anode, a cathode depolarizer composed of a mixture of mercuric dioxysulfate with a minor amount of finely divided carbon, and an aqueous electrolyte comprising an alkaline earth metal sulfate solution and 5% to 25% by volume of a solution selected from the group consisting of alkali metal acetates and alkaline earth metal acetates, the concentration of said sulfate solution being between 10 g. and 30 g. per 100 ml. and the concentration of said acetate being between 10 g. and 30 g. per 100 ml., said electrolyte also containing a small amount of soluble chromate inhibitor.

15. A primary cell comprising a zinc anode, a cathode depolarizer composed of an intimate mixture of mercuric dioxysulfate with a minor amount of finely divided carbon, an aqueous electrolyte of zinc sulfate containing a small percentage of a soluble chromate inhibitor, and a buffer solution selected from the group consisting of alkali metal acetates and alkaline earth metal acetates admixed with said zinc sulfate electrolyte in an amount sufficient to maintain the pH of the electrolyte at a value between approximately 4.5 and 6.5.

16. A primary dry cell comprising a zinc anode can, a porous spacer lining said can, a compressed cathode depolarizer body composed of mercuric dioxysulfate in intimate admixture with a minor amount of finely divided carbon in contact with said spacer, a sulfate salt electrolyte containing a small percentage of a soluble chromate inhibitor impregnating said cathode depolarizer, and a buffer agent effective to substantially stabilize the pH of the electrolyte at a predetermined value.

17. A cathode mix for electric current producing cells consisting essentially of a mercuric dioxysulfate depolarizer and finely divided electronically conductive material.

18. A cathode mix for electric current producing cells consisting essentially of a mercuric dioxysulfate depolarizer and finely divided carbon.

References Cited in the file of this patent

UNITED STATES PATENTS

| 761,641 | Atwood | June 7, 1904 |
| 941,416 | Heil | Nov. 30, 1909 |
| 1,839,498 | Porth | Jan. 5, 1923 |

OTHER REFERENCES

Mellor, J. W.: A Comprehensive Treatise on Inorganic and Theoretical Chemistry, vol. IV, pp. 969–75, Longmans, Green & Co., London, 1946.